March 6, 1928.
A. F. MASURY ET AL
1,661,187
VEHICLE BODY
Filed Dec. 4, 1925
2 Sheets-Sheet 2
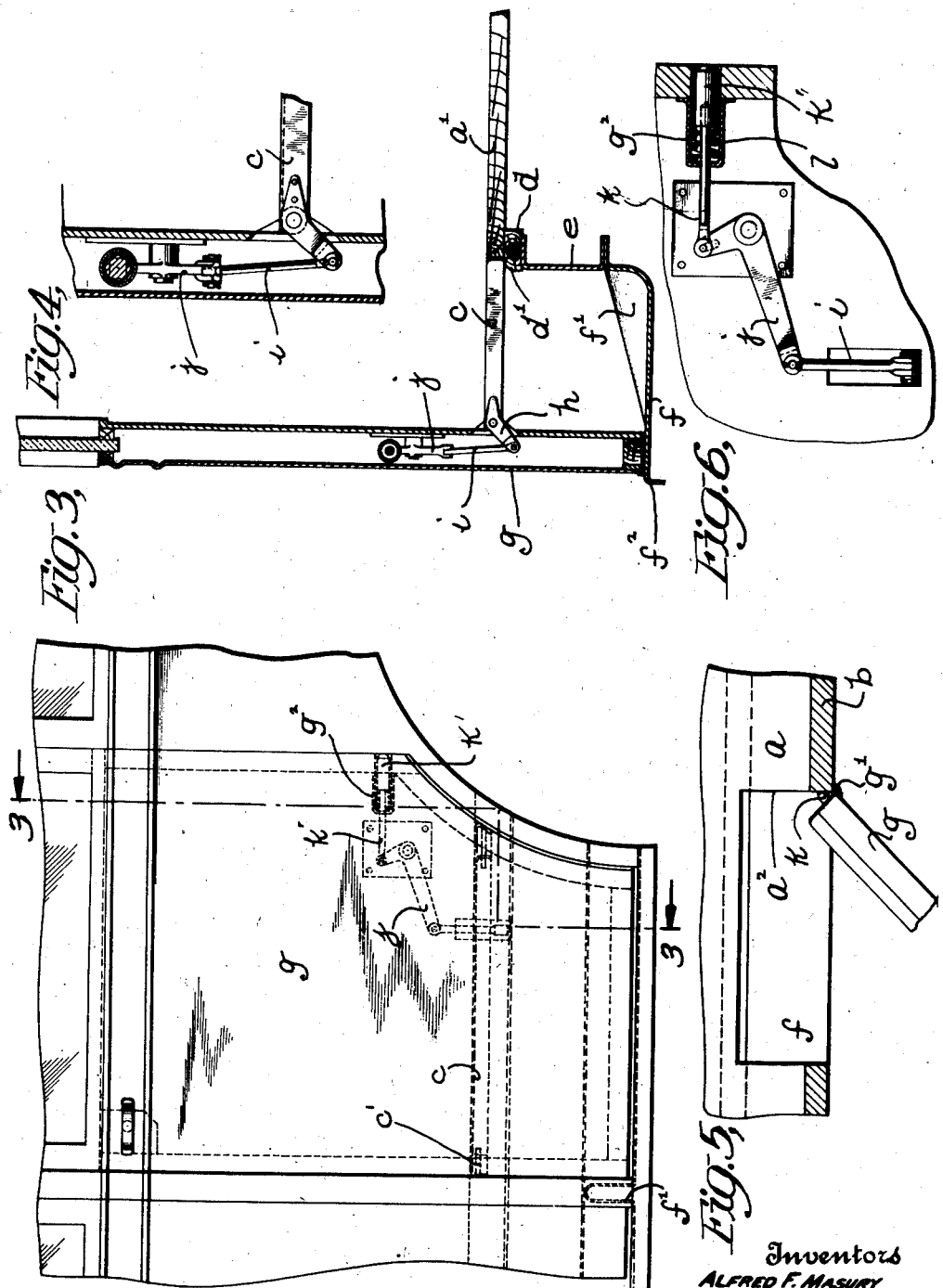
Inventors
ALFRED F. MASURY
CHARLES FROESCH
By their Attorneys
Redding, Greeley, O'Shea & Campbell Patented Mar. 6, 1928.

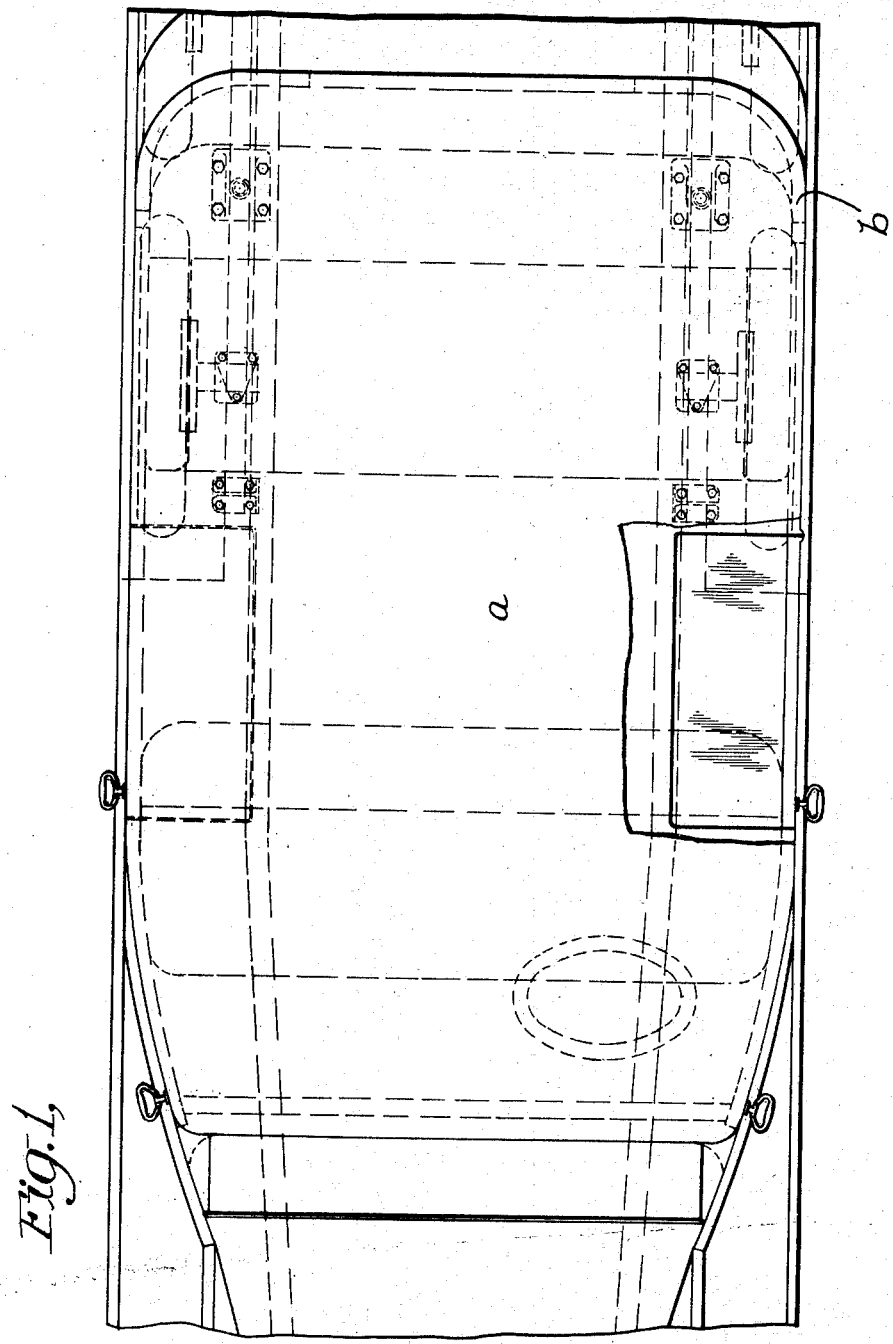

1,661,187

UNITED STATES PATENT OFFICE.

ALFRED F. MASURY AND CHARLES FROESCH, OF NEW YORK, N. Y., ASSIGNORS TO INTERNATIONAL MOTOR COMPANY, OF NEW YORK, N. Y., A CORPORATION OF DELAWARE.

VEHICLE BODY.

Application filed December 4, 1925. Serial No. 73,077.

This invention relates to bodies for vehicles and particularly motor vehicles and has for its principal object to provide a body having the advantages of decreased head resistance, a low center of gravity and maximum internal width. It has heretofore been proposed to provide a body for motor vehicles whereof the side walls are disposed along the outer edges of what may be termed the running boards while the floor of the vehicle proper is disposed below the longitudinal side frame members of the chassis in substantially the plane of the running boards. With such a construction the passengers' feet are carried in what amounts to four wells formed by the two longitudinal members of the chassis frame and the offset in the floor over the propeller shaft. The present invention seeks to avoid this cumbersome arrangement and obtain unusual body width with an uninterrupted floor from the door at one side of the body to the door on the other side. To this end the floor of the vehicle is carried upon the side frame members of the chassis and rests upon the upper edges thereof while supplemental floor sections adapted to continue the floor over the running boards are movable out of the way to expose the running board when it is desired to enter or leave the vehicle. More particularly, the supplemental floor sections are pivotally connected to the doors and are movable from a position in continuation of the main floor section of the vehicle when the door is closed to a position parallel with and adjacent the door when the door is open by automatic actuating devices operable upon opening or shutting the door.

In order that the invention may be clearly understood and readily carried into effect the same will now be described more fully with reference to the accompanying drawings forming a part hereof, in which:

Figure 1 is a plan view with parts broken away showing the vehicle body according to the present invention and the doors upon either side thereof.

Figure 2 is a fragmentary view in side elevation showing a door upon one side of the vehicle and the actuating devices for the articulated floor section.

Figure 3 is a view in transverse vertical section taken in the planes indicated by the broken line 3—3 in Figure 2 and looking in the direction of the arrows and showing the articulated floor section disposed in prolongation of the main vehicle floor.

Figure 4 is a view on an enlarged scale showing the actuating mechanism.

Figure 5 is a fragmentary view looking from above and showing the door partly open and a plunger protruding under the influence of a spring in effecting the movement of the articulated floor section from operative position to folded position against the inner side of the door.

Figure 6 is a fragmentary view on an enlarged scale showing the actuating mechanism in detail.

The floor of the vehicle is indicated as a whole at $a$ and the wall at $b$. The floor comprises a stationary floor section $a'$ and articulated floor sections $c$. The floor $a'$ is supported upon a body sill $d$ resting upon the upper surface of a side frame member $e$ of the chassis. Supported from the frame member $e$ is a running board $f$ provided with stiffening ribs $f'$ at suitable points. The doors of the vehicle are indicated at $g$ and are in the plane of the side walls $b$. It will be observed from an inspection of Figure 3 that the door $g$ is disposed at substantially the outer edge $f^2$ of the running board whereby the maximum width of the vehicle is availed of for the body. Door $g$ may be hinged as at $g'$ to a body pillar as will be understood and immediately adjacent the door the floor $a$ is cut out as at $a^2$ whereby the running board $f$ may serve as a step on entering and leaving the vehicle. When the door is closed it is desirable to prolong the floor $c$ over the step $f$ and accordingly an articulated floor section $c$ is carried in bearings $c'$ on the inner side of the door. When the door is opened it is desirable that the floor section $c$ be so disposed as not to interfere with the passenger entering or leaving the vehicle and to this end it is proposed to fold the floor section $c$ upwardly or downwardly against the inner face of the door. Devices are provided which will operate upon opening the door to fold floor section $c$ against the door and upon closing the door to swing the floor section into the plane of the stationary floor $a'$. The floor section $c$ is shown in Figure 3 as resting upon the body sill at its interior edge and the floor section is adapted to be swung downwardly out of the way. To this end a bell-crank lever $h$ may be pivotally mounted upon the door and one arm of the lever may be secured to the floor section. The other arm of the lever is connected as by a link $i$ to one arm of an operating bell-crank lever $j$ pivotally mounted within the interior of the door, the other arm of which is connected to the stem $k$ of a plunger $k'$ disposed within a recess $g^2$ formed in the door whereby it may be forced outwardly against the body post by a spring $l$.

Thus when the door is opened as shown in Figure 5 spring $l$ forces the plunger $k'$ outwardly of the recess $g^2$ thereby causing the operating bell crank lever $j$ to rotate about its pivot in a clockwise direction as viewed in Figure 6. This movement of the bell-crank lever $j$ causes the link $i$ to turn the swinging floor lever $h$ in clockwise direction as viewed in Figure 3 to cause the floor section $c$ to swing downwardly against the inner face of the door. The body sill may be slightly beveled as at $d'$ to permit easy entering of the swinging panel thus allowing for manufacturing limits. When the door is closed the plunger $k'$ is forced inwardly against the action of the spring $l$ whereby the levers are caused to rotate in opposite directions to raise the floor section $c$ to operative weight supporting position, the degree of rotation of floor section $c$ about its bearings $c'$ being, of course, dependent upon the degree of opening of the door $g$ within a certain obvious limit.

The invention is not to be deemed limited to the precise construction and arrangement of parts illustrated in the accompanying drawings or described in the foregoing specification since various embodiments of the articulated floor section actuating mechanism and the manner of effecting its operation will occur to those skilled in the art.

What we claim is:

1. In a vehicle body having a floor and a step below the floor level, a door at the edge of the step, an articulated floor section carried with the door, and means carried with the door and automatically operable upon movement of the door to move said section between a position in continuation of the floor and a position uncovering the step.

2. In a vehicle body having a floor and a step below the floor level, a door at the edge of the step, an articulated floor section carried with the door, and spring pressed means carried with the door and automatically operable upon movement of the door to move said section between a position in continuation of the floor and a position uncovering the step.

3. In a vehicle body having a floor and a step below the floor level, a door at the edge of the step, an articulated floor section carried with the door, means carried with the door to move said section into and out of operative position, said means being automatically operable upon movement of the door and comprising spring pressed actuating mechanism whereby when the door is closed the floor section will be maintained in a position in continuation of the floor of the vehicle body and when the door is opened the floor section will be automatically folded into parallel relation with the door and into a position uncovering the step.

4. In a vehicle body having a floor and a step below the floor level, a door at the edge of the step, an articulated floor section carried with the door, means carried with the door and automatically operative upon movement thereof to move said floor section into and out of operative position, said means comprising a spring pressed plunger carried with the door and projecting through one edge thereof and adapted to abut against a portion of the vehicle body with which the door is carried, and operative connections comprising a system of links and levers between the plunger and the floor section, whereby when the door is closed the floor section will be maintained in a position in continuation of the floor of the vehicle body and when the door is opened the floor section will be automatically folded into parallel relation with the door and into a position uncovering the step.

This specification signed this 17th day of November, A. D. 1925.

ALFRED FELLOWS MASURY.
CHARLES FROESCH.